(12) United States Patent
Motomura

(10) Patent No.: US 10,288,077 B2
(45) Date of Patent: May 14, 2019

(54) BLOWER DEVICE

(71) Applicant: DENSO CORPORATION, Kariya, Aichi-pref. (JP)

(72) Inventor: Hirohisa Motomura, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 321 days.

(21) Appl. No.: 15/120,142

(22) PCT Filed: Apr. 28, 2015

(86) PCT No.: PCT/JP2015/002274
§ 371 (c)(1),
(2) Date: Aug. 19, 2016

(87) PCT Pub. No.: WO2015/174038
PCT Pub. Date: Nov. 19, 2015

(65) Prior Publication Data
US 2017/0058903 A1 Mar. 2, 2017

(30) Foreign Application Priority Data

May 12, 2014 (JP) ................................. 2014-098970

(51) Int. Cl.
*F04D 25/06* (2006.01)
*F04D 17/16* (2006.01)
(Continued)

(52) U.S. Cl.
CPC ......... *F04D 25/06* (2013.01); *B60H 1/00471* (2013.01); *F04D 17/16* (2013.01);
(Continued)

(58) Field of Classification Search
CPC ...... F04D 25/06; F04D 29/162; F04D 29/083; F04D 17/16; F04D 29/624; F04D 29/4206; B60H 1/00471
See application file for complete search history.

(56) References Cited

U.S. PATENT DOCUMENTS 6,107,708 A * 8/2000 Yamaguchi ........ B60H 1/00457
310/58
7,554,239 B2 * 6/2009 Suzuki ................. H01R 39/381
310/239

(Continued)

FOREIGN PATENT DOCUMENTS

JP   H11082384 A    3/1999
JP   2003328995 A   11/2003
(Continued)

OTHER PUBLICATIONS

Journal of Technical Disclosure No. 2013-503450.

*Primary Examiner* — Charles G Freay
(74) *Attorney, Agent, or Firm* — Harness, Dickey & Pierce, P.L.C.

(57) ABSTRACT

A blower device includes: a ring cover attached to a motor holder along an opening to cover a motor top; and a blower fan having a rotation center to which a rotation shaft is coupled. The blower fan has a lower end portion that is adjacent to the motor holder. The ring cover includes: a sleeve portion covering the motor top; a flange portion extending continuously from a lower end of the sleeve portion to cover a surface of the motor holder; and a skirt portion formed along a periphery of the flange portion in an annular shape. The skirt portion with the annular shape is pressed into an annular groove of the motor holder.

13 Claims, 8 Drawing Sheets

(51) Int. Cl.
  F04D 29/28    (2006.01)
  F04D 29/42    (2006.01)
  F04D 29/62    (2006.01)
  B60H 1/00     (2006.01)
  F04D 29/08    (2006.01)
  F04D 29/16    (2006.01)

(52) U.S. Cl.
  CPC ......... *F04D 29/083* (2013.01); *F04D 29/162* (2013.01); *F04D 29/281* (2013.01); *F04D 29/4206* (2013.01); *F04D 29/624* (2013.01)

(56) References Cited

U.S. PATENT DOCUMENTS

| | | | |
|---|---|---|---|
| 8,267,674 B2 * | 9/2012 | Czulak | F04D 29/584 417/370 |
| 2011/0116928 A1 * | 5/2011 | Czulak | F04D 25/082 416/95 |
| 2016/0305435 A1 * | 10/2016 | Kamiya | F04D 29/281 |

FOREIGN PATENT DOCUMENTS

| | | | |
|---|---|---|---|
| JP | 2004040935 A | | 2/2004 |
| JP | 2004-159411 | * | 6/2004 |
| JP | 2007154856 A | | 6/2007 |

* cited by examiner

BLOWER DEVICE

CROSS REFERENCE TO RELATED APPLICATIONS

This application is a U.S. National Phase Application under 35 U.S.C. 371 of International Application No. PCT/JP2015/002274 filed on Apr. 28, 2015 and published in Japanese as WO 2015/174038 A1 on Nov. 19, 2015. This application is based on and claims the benefit of priority from Japanese Patent Application No. 2014-098970 filed on May 12, 2014. The entire disclosures of all of the above applications are incorporated herein by reference.

TECHNICAL FIELD

The present disclosure relates to a blower device.

BACKGROUND ART

In a blower device described in Patent Literature 1, a sirocco fan forming a blower fan is stored in a blower case. A shaft of a blower motor is coupled to a rotation center of the fan. The blower motor is surrounded by a motor holder. The motor holder is connected to the blower case. The blower case is attached to a vehicle body.

The blower fan draws in air selectively from inside and outside a vehicle via a movable damper. An air stream is sent from the blower case to an air-conditioning duct of a vehicle air-conditioning device by rotations of the blower fan. Air-conditioning air at a temperature adjusted by an evaporator and a heater disposed in the air-conditioning duct is blown into a vehicle interior.

PRIOR ART LITERATURES

Patent Literature

Patent Literature 1: JP H11-82384A

SUMMARY OF INVENTION

Air drawn in from outside the vehicle via the movable damper occasionally includes rain water or the like. Water is diffused and turned into mist by the blower fan and scatters around the blower motor from the motor holder. At least a rotation shaft of the blower motor protrudes from a motor housing. A wiring portion to supply the blower motor with a power supply passes through the motor housing. A rubber grommet is provided to make the wiring portion waterproof. Nevertheless, water easily comes inside.

Water also easily comes inside from a clearance between the rotation shaft and the motor housing. Water that has come inside may cause a formation of rust in bearings and deterioration in insulation performance of the blower motor.

Meanwhile, an open (unsealed) blower motor, in which a component in the motor, such as an armature, is exposed to the outside, is used often with the aim of enhancing heat dissipation of the blower motor. In addition, a rotation speed of the blower motor is increasing, that is, the trend is shifting to so-called a high-power motor. It is therefore desirable that a waterproof measure of the blower device is further improved.

The present disclosure is aimed to provide a blower device in which water dropping from a blower fan is restricted from entering a blower motor through a surface of a motor holder.

The description contents of patent documents listed as prior arts can be incorporated by reference as explanation of technical elements described in this specification.

According to an aspect of the present disclosure, a blower device includes a motor holder, a blower motor, a ring cover, and a blower fan. The motor holder has an opening at a center and an annular groove along the opening. The blower motor is attached to the motor holder, and has a motor top and a rotation shaft protruding from the opening. The ring cover is attached to the motor holder to cover a periphery of the blower motor along the opening. The blower fan has a rotation center to which the rotation shaft is coupled above the blower motor.

The ring cover includes a sleeve portion, a flange portion and a skirt portion. The sleeve portion covers the periphery of the blower motor in a ring shape. The flange portion extends continuously from a lower end of the sleeve portion in an annular shape to partially cover a surface of the motor holder. The skirt portion protrudes from the flange portion in an annular shape and is inserted into the annular groove.

Water that has come into the blower device heads for the blower motor through a clearance between the surface of the motor holder and the ring cover. However, a water incoming route is bent in a U shape by the annular skirt portion inserted into the annular groove. A labyrinth structure is formed by inserting the annular skirt portion into the annular groove and the labyrinth structure lying in the water incoming route prevents water from coming into the blower motor. Water that has reached a top of the ring cover has to surmount the sleeve portion provided to erect like a wall. Hence, water reaching as far as the blower motor can be limited by the sleeve portion.

DESCRIPTION OF EMBODIMENTS

Embodiment

Prior to a description of one embodiment, a blower device which is not known yet and in a developmental process will be described as a comparative example of the embodiment.

Figure 7:
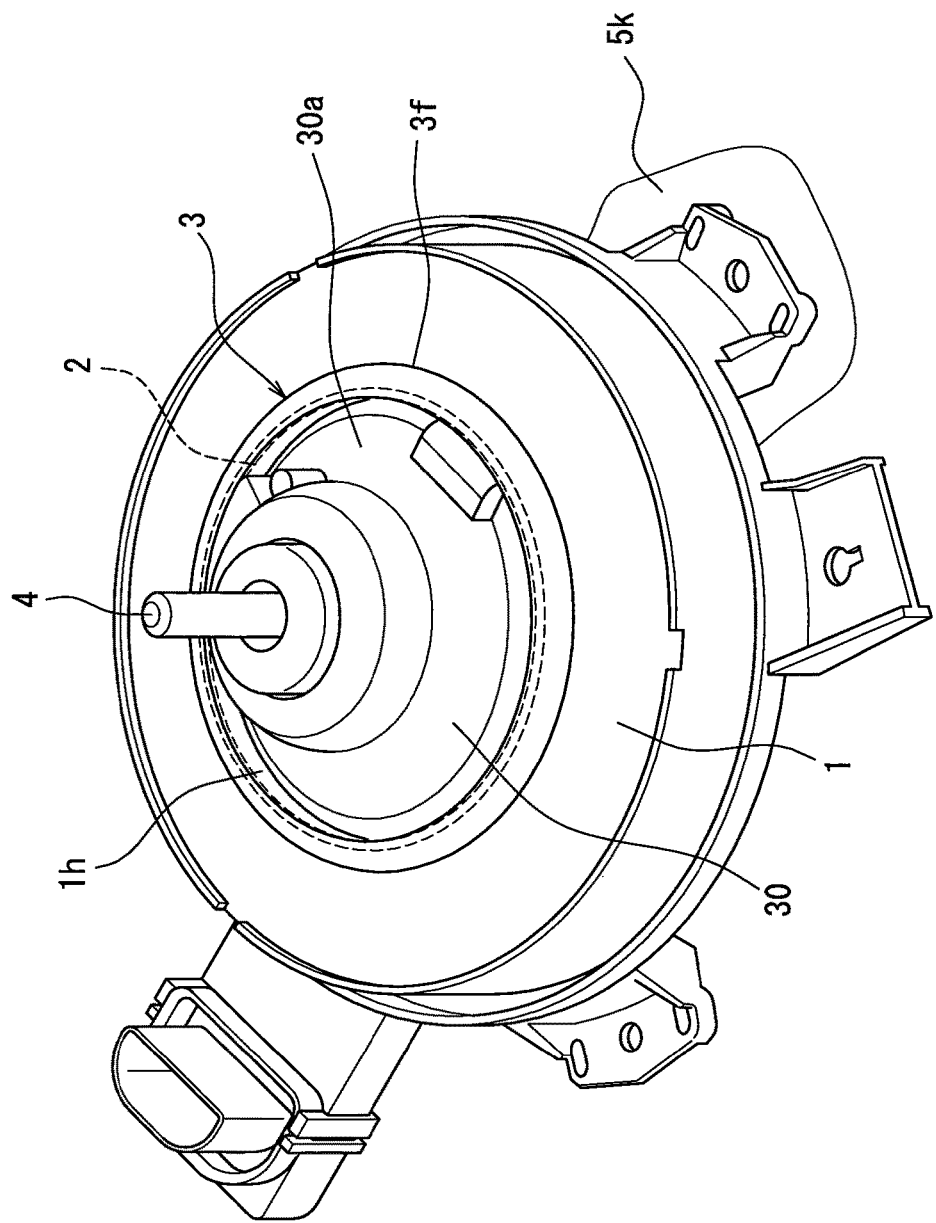
FIG. 7 is a perspective view illustrating a motor top, a ring cover, and a motor holder of a blower device of a comparative example.
Figure 8:
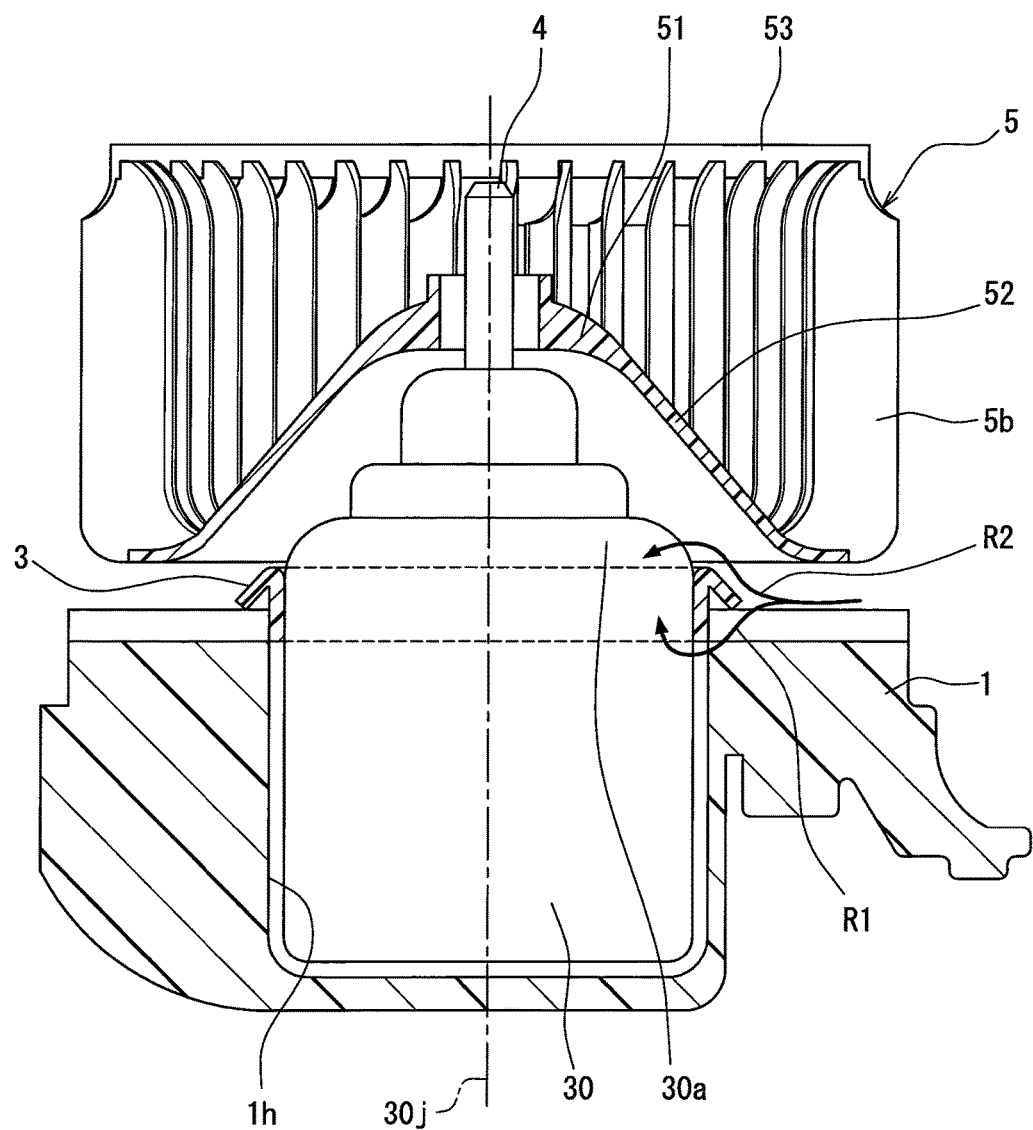
FIG. 8 is a partial, longitudinal sectional view illustrating a blower motor and a blower fan of the blower device of the comparative example.

FIG. 7 and FIG. 8 show a blower device of a comparative example. FIG. 8 is used to describe water incoming routes in a blower device in which a blower fan 5 formed of a multi-blade fan is rotated above a blower motor 30.

As is shown in FIG. 7, a motor holder 1 having a disc-like top is provided with a hole 1*h* in which to store the blower motor 30, and the blower motor 30 is inserted in an opening 2 of the hole 1*h*. Water is hardly allowed to reach a motor top 30*a* by capping a ring cover 3, which is a separate body from the motor holder 1, on a surface of the motor holder 1 on a periphery of the motor top 30*a*.

As is shown in FIG. 8, the ring cover 3 is a ring-shaped strip surrounding the blower motor 30 and an upper end is folded back like eaves to force water climbing up the ring-shaped strip to swirl back. By capping the ring cover 3 on the periphery of the blower motor 30, a clearance between an outer periphery of the blower motor 30 and an inner periphery of the hole 1*h* of the motor holder 1 can be concealed. Hence, entrance of water into the clearance can be prevented.

Nevertheless, the configuration as above fails to prevent water from coming into the blower motor 30 in some cases. Water comes inside in two routes. Referring to FIG. 8, a first route R1 is a route in which water comes into a clearance between the motor holder 1 and the ring cover 3 via the lower side.

A second route R2 is a route in which water comes into the motor top 30*a* by climbing up outer surfaces of the motor holder 1 and the ring cover 3. It should be noted, in particular, that the blower motor 30 not sealed in a cylindrical motor housing, that is, an open type is used often recently as the blower motor 30 with the aim of enhancing heat dissipation and reducing a weight. In such a case, water comes into the blower motor 30 more easily.

The blower fan 5 has an umbrella-shaped slope portion 52 in which to install the blower motor 30 at a center. Hence, when water, in particular, water from the outside, splatters on the blower fan 5 of FIG. 8, water running down the slope portion 52 is turned to mist by the blower fan 5 rotating at a high speed. Mist of water easily comes into the blower motor 30 through the first route R1 and the second route R2.

A large number of blades 5*b* are connected to the slope portion 52 at or near a lower end. Upper ends of the respective blades 5*b* are connected by a ring portion 53. Accordingly, the multi-blade fan is shaped like a squirrel cage.

In contrast to the comparative example, one embodiment will now be described using FIG. 1 through FIG. 6. One embodiment of the present disclosure provides a blower device in which water hardly comes into the blower motor 30, in particular, through the first route R1 and the second route R2.

Figure 5:
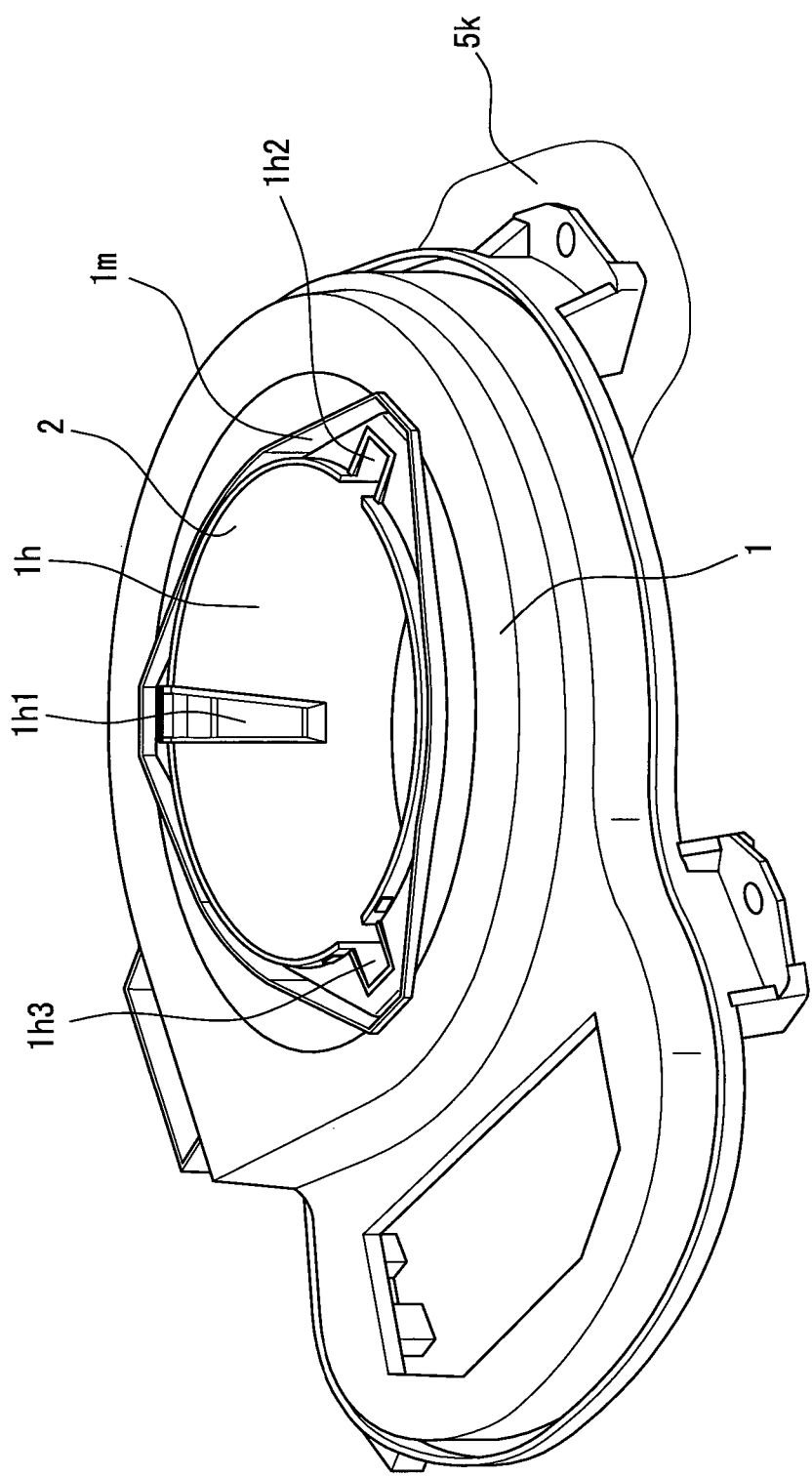
FIG. 5 is a perspective view of a motor holder illustrating an annular groove provided on a periphery of a hole of a motor holder in which to store the blower motor.

As is shown in FIG. 5, the blower device has the motor holder 1. The motor holder 1 has a disc-shaped top provided with the hole 1*h* at a center, and is attached to a blower casing 5*k* with bolts or the like. Three recesses 1*h*1, 1*h*2, and 1*h*3 are provided to an inner wall of the hole 1*h*. Unillustrated floating rubber is inserted into the recesses 1*h*1 through 1*h*3. A housing of the blower motor 30 is inserted into the hole 1*h* from the opening 2 via the floating rubber and supported on the motor holder 1. The floating rubber prevents vibrations of the blower motor 30 from being transmitted to the motor holder 1 and further to the vehicle interior by way of the blower casing 5*k*.

Figure 6:
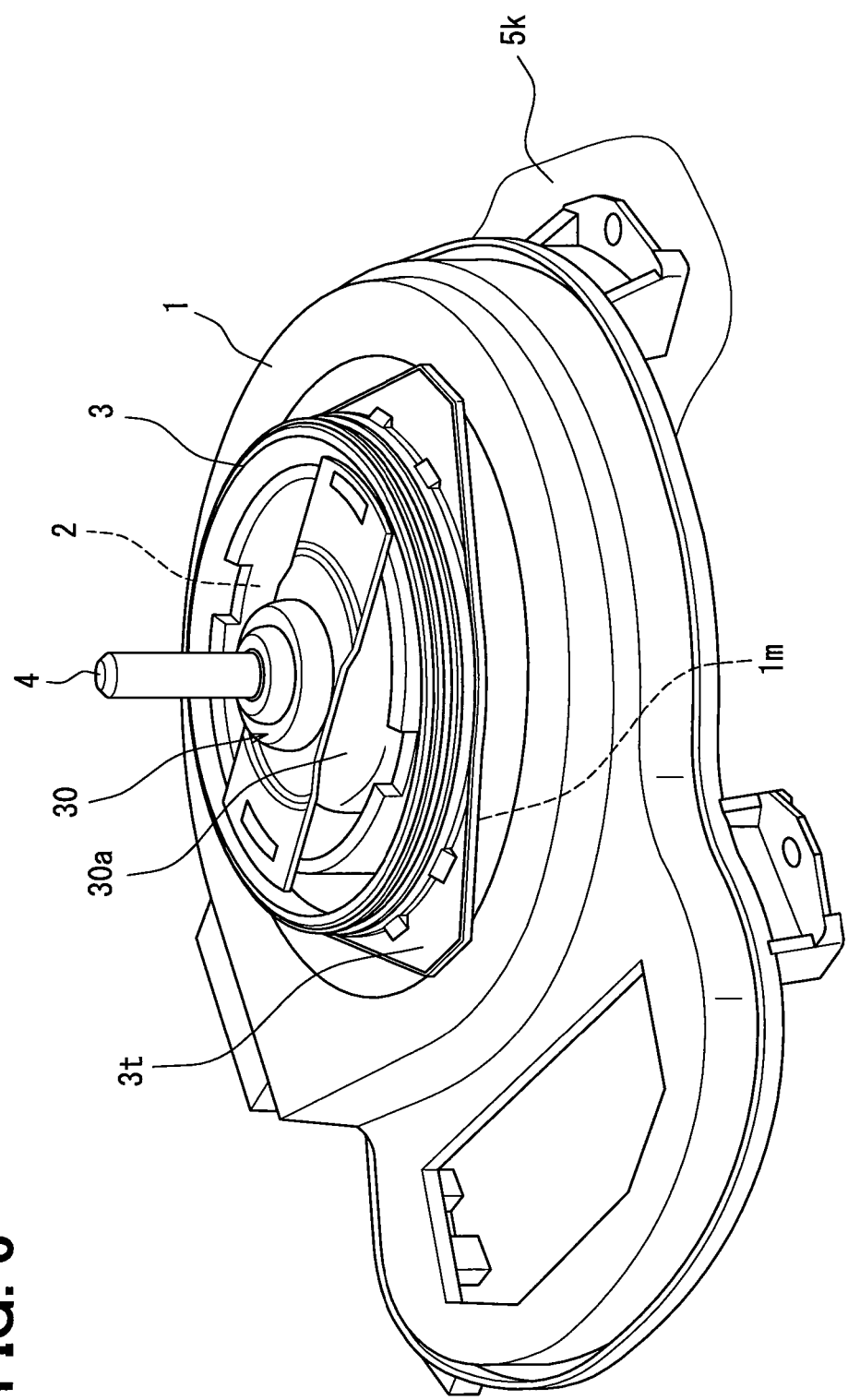
FIG. 6 is a perspective view illustrating a state in which the blower motor is stored in an opening of the motor holder and the ring cover is capped on the blower motor in the embodiment.

An annular groove 1*m* is provided on a periphery of the three recesses 1*h*1 through 1*h*3 in which to store the floating rubber. The blower motor 30 is inserted into the hole 1*h* from the opening 2 in the same manner as described with reference to FIG. 7. As is shown in FIG. 6, a rotation shaft 4 of the blower motor 30 protrudes upward from a center of the blower motor 30. The rotation shaft 4 and the motor top 30*a* protrude from the opening 2. The blower motor 30 is a DC commutator motor with a field induced from a permanent magnet.

The ring cover 3 is attached to the motor holder 1 along the opening 2 of FIG. 6 so as to cover a periphery of the motor top 30*a*. The motor holder 1 has the annular groove 1*m*. An annular skirt portion 3*w* formed like a wall in an outer peripheral portion of the ring cover 3 is lightly press-fit into the annular groove 1*m*. The phrase, "lightly press-fit", referred to herein means to press-fit the annular skirt portion 3*w* with a relatively weak force. Consequently, the ring cover 3 is attached to a surface of the motor holder 1. Alternatively, the ring cover 3 may be coupled to the motor holder 1 with claws or pins.

Figure 3:
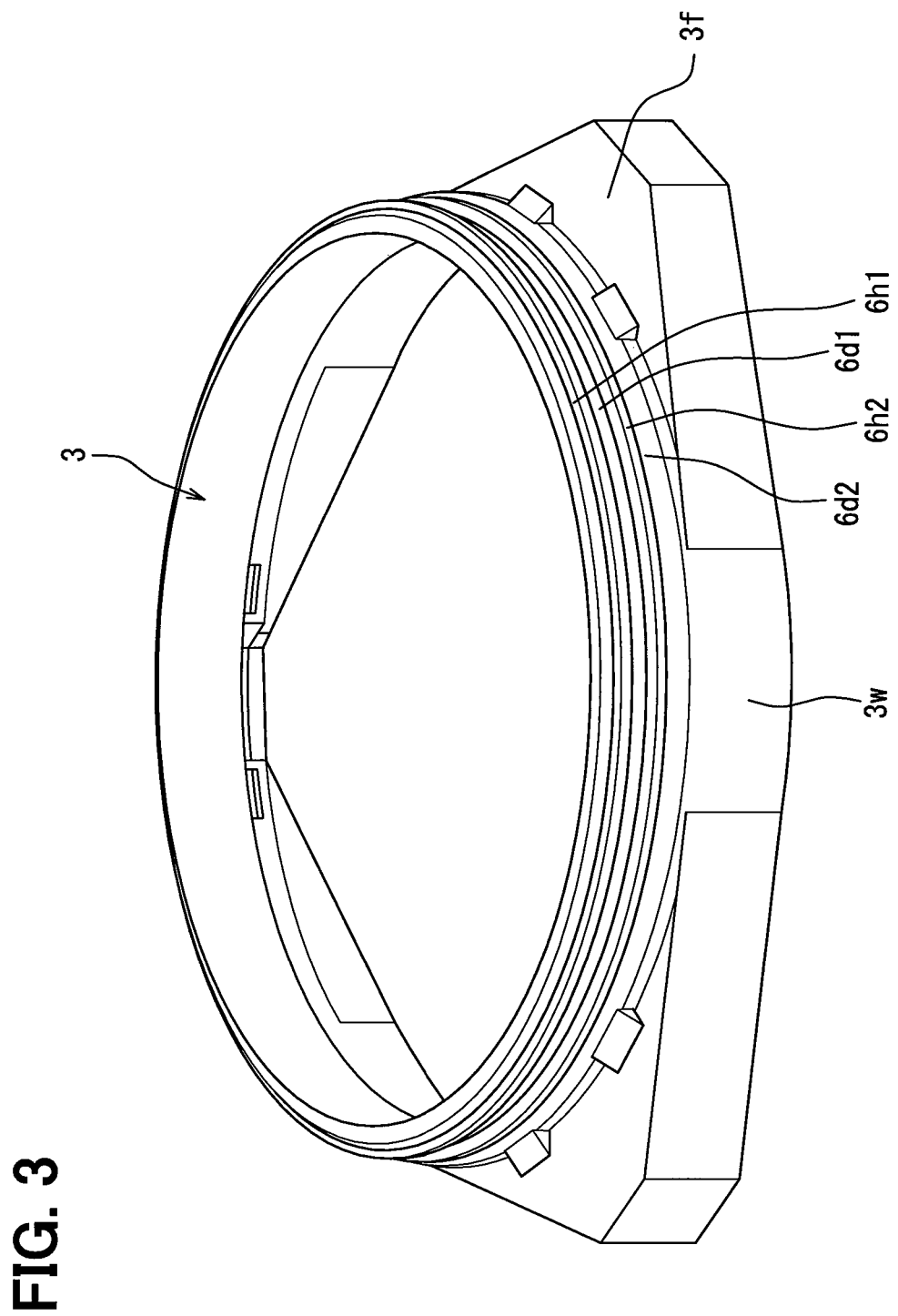
FIG. 3 is a perspective view of the ring cover in the embodiment.
Figure 4:
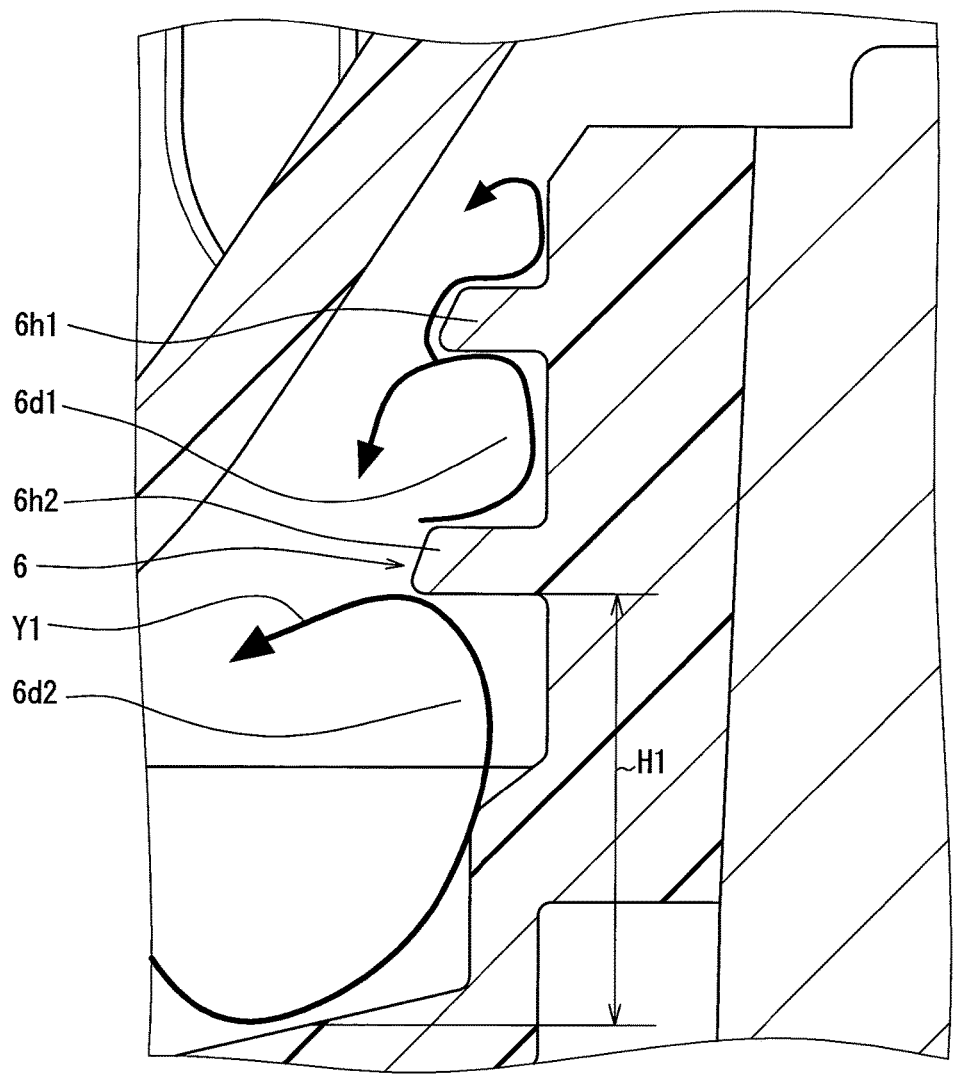
FIG. 4 is an enlarged view illustrating shapes of ring protrusions of FIG. 3.

The annular groove 1*m* is shaped so as to conform to an outer peripheral shape of the ring cover 3 and is of a non-circular (substantially triangular) shape along protrusions 3*t* of the ring cover 3 at three points. The annular groove 1*m* is of a non-circular shape because the annular groove 1*m* extends by avoiding the recesses 1*h*1 through 1*h*3 in which to insert the floating rubber. By shaping the annular groove 1*m* not into a circular shape but into a non-circular shape as above, a peripheral length of the annular groove 1*m* can be shorter and consequently the ring cover 3 can be smaller in size. Also, as is shown in FIG. 3, the ring cover 3 has a portion in which hardly any flange portion 3*f* is provided and a sleeve portion 3*s* rises next to the annular groove 1*m*. The flange portion 3*f* itself is not essentially required to prevent water from coming into the blower motor 30.

Figure 1:
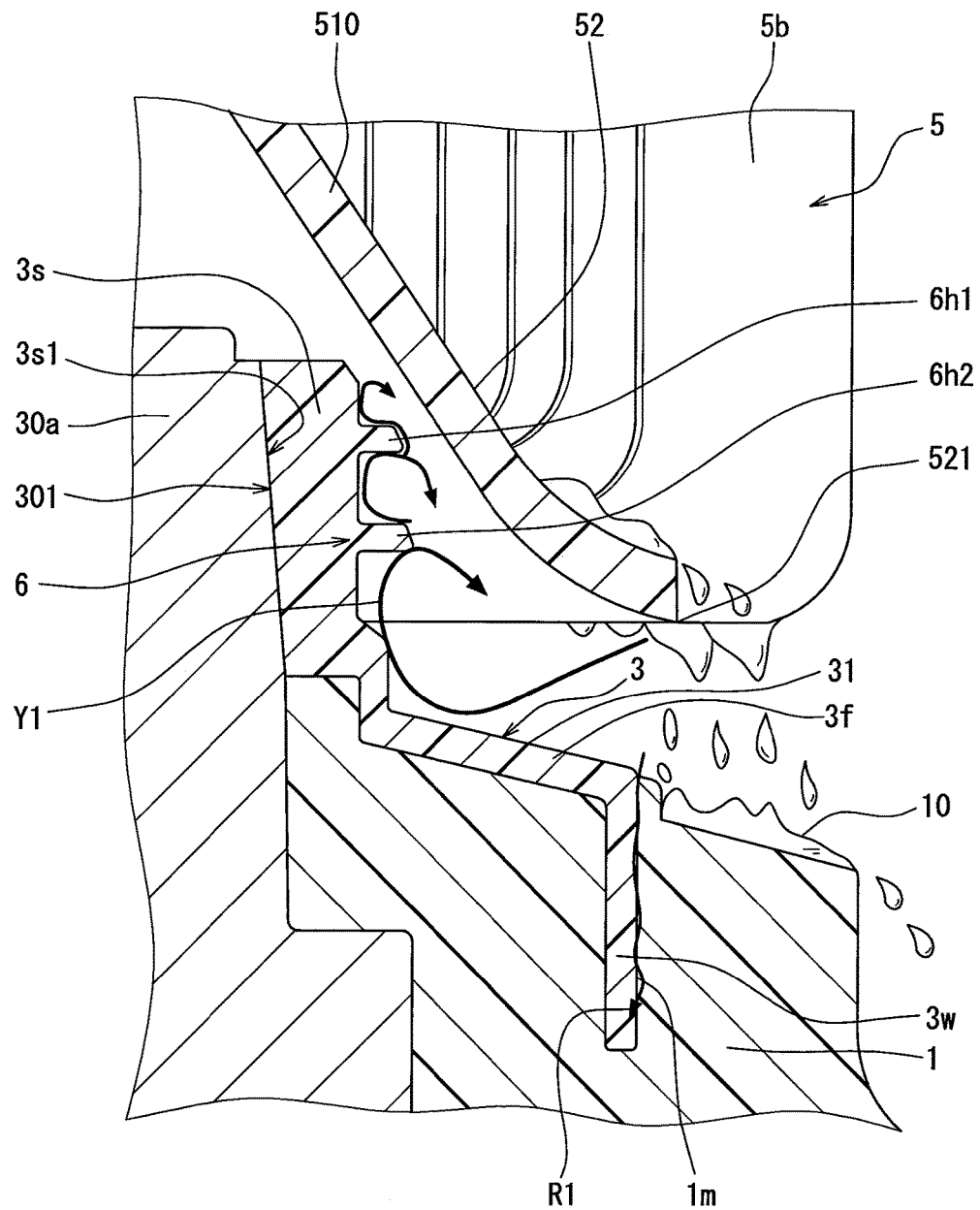
FIG. 1 is a partial sectional view illustrating a coupled portion of a blower motor and a blower fan of a blower device according to an embodiment.
Figure 2:
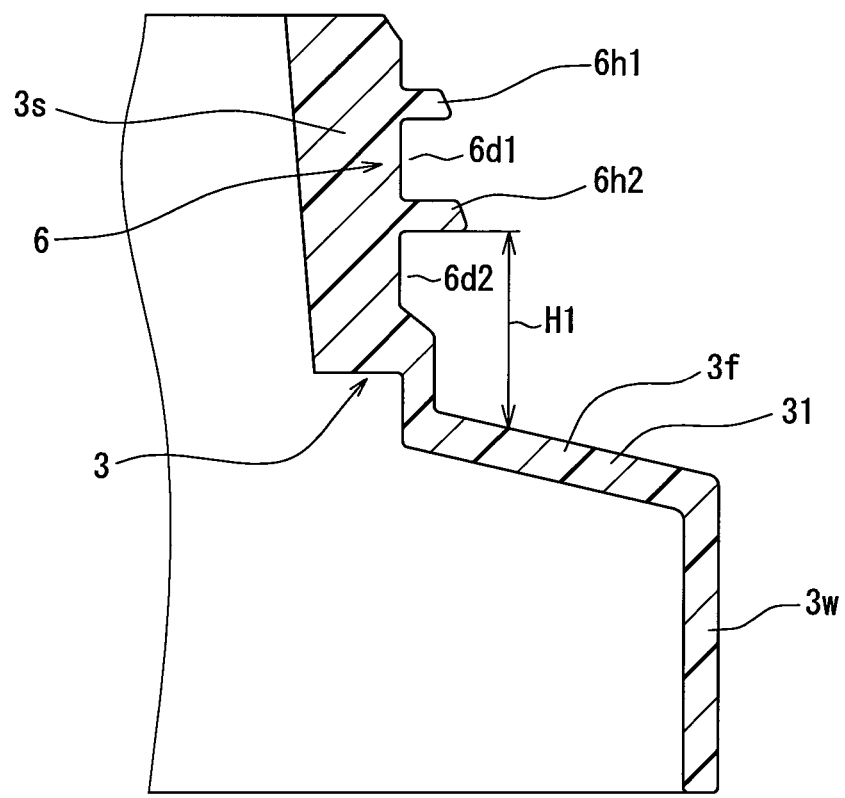
FIG. 2 is a partial sectional view of a ring cover in the embodiment.

Regarding the blower fan 5, a rotation center of the blower fan 5 is coupled to the blower motor 30 and, as is shown in FIG. 1, a lower end of the blower fan 5 faces the motor holder 1. As is shown in FIG. 2, a sectional shape of the ring cover 3 has the sleeve portion 3*s* provided with multiple bump-and-dip portions 6 circumferentially and partially covering the motor top 30*a*.

The bump-and-dip portions 6 include at least one ring-like protrusion 6*h*1 and one ring-like protrusion 6*h*2. The protrusions 6*h*1 and 6*h*2 are provided at a regular interval in a top-bottom direction.

The ring cover 3 has the flange portion 3*f* continuing from a lower end of the sleeve portion 3*s* and partially covering the surface of the motor holder 1. The annular skirt portion 3*w* is provided to hang downward from the flange portion 3*f*. The annular skirt portion 3*w* is lightly press-fit into the annular groove 1*m* of the motor holder 1.

FIG. 1 shows the annular skirt portion 3*w* hangs downward from a rim of the flange portion 3*f*. However, the annular skirt portion 3*w* may be provided to hang downward in FIG. 1 by branching from the flange portion 3*f* on an inner side of the rim.

The flange portion 3*f* covers the surface of the motor holder 1 and is inclined moderately for water to run down from a center to an outer peripheral side of the motor holder 1. However, the flange portion 3*f* may not be necessarily inclined as above.

As is shown in FIG. 1, the sectional shape of the sleeve portion 3*s* is of a wedge shape that becomes thinner from top to bottom. An inner peripheral portion 3*s*1 of the sleeve portion 3*s* is in close contact with an outer peripheral portion 301 of the blower motor 30. The outer peripheral portion 301 of the blower motor 30 with which the inner peripheral portion 3*s*1 of the sleeve portion 3*s* makes close contact tilts with respect to a top-bottom direction of FIG. 1, that is, a direction of a center axis 30*j* of the blower motor 30 (refer to FIG. 8).

The inner peripheral portion 3*s*1 of the sleeve portion 3*s* also tilts with respect to the direction of the center axis 30*j* of the blower motor 30. On the contrary, the annular groove 1*m* and the annular skirt portion 3*w* lightly press-fit into the annular groove 1*m* are parallel to the direction of the center axis 30*j*. Hence, when the ring cover 3 is attached on top of the motor holder 1 by inserting the annular skirt portion 3*w* into the annular groove 1*m*, the inner peripheral portion 3*s*1 of the sleeve portion 3*s* applies a radially inward pressure on the outer peripheral portion 301 of the blower motor 30. Consequently, the inner peripheral portion 3*s*1 of the sleeve portion 3*s* is pressed against the outer peripheral portion 301 of the blower motor 30.

When pressed against as above, the inner peripheral portion 3*s*1 of the sleeve portion 3*s* and the outer peripheral portion 301 of the blower motor 30 no longer form a clearance in between. Hence, entrance of water is prevented substantially completely.

Each of the motor holder 1 and the ring cover 3 is a resin molded article. The sleeve portion 3*s*, the bump-and-dip portions 6, the flange portion 3*f*, and the annular skirt portion 3*w*, all of which are parts of the ring cover 3, are molded in series from a same resin material and therefore formed into a single unit.

As are shown in FIG. 2 and FIG. 3, the bump-and-dip portions 6 include the ring-like first protrusions 6*h*1, the ring-like second protrusions 6*h*2, and dents 6*d*1 and 6*d*2 made under the protrusions 6*h*1 and 6*h*2, respectively. A height H1 of the dent 6*d*2 in a bottom step is set to be higher than a height of the dent 6*d*1 located above. The shapes are same in FIG. 3, FIG. 4, and FIG. 5.

In the present embodiment, the multiple protrusions 6*h*1 and 6*h*2 are provided. However, the bump-and-dip portions 6 may be formed of either the protrusion 6*h*1 or the protrusion 6*h*2 alone. In addition, a radial protruding length of the second protrusion 6*h*2 at the lowest position is set to be longer than a radial protruding length of the first protrusion 6*h*1 located above. As are shown in FIG. 2 and FIG. 3, the multiple protrusions 6*h*1 and 6*h*2 extend entirely along the cylindrical sleeve portion 3*s* like a double-fold ring.

According to the embodiment above, the blower motor 30 is inserted into the opening 2 of the hole 1*h* of the motor holder 1. Water 10 reaches the motor top 30*a* in the opening 2 from the surface of the motor holder 1 through the two routes described above.

The motor holder 1 surrounds the blower motor 30 in an annular shape. Hence, an incoming route of the water 10 has the second route R2 as shown in FIG. 8 in which the water 10 heads into the opening 2 from the outer periphery of the motor holder 1 by surmounting the wall formed by the sleeve portion 3*s* of the ring cover 3.

The sleeve portion 3*s* of the ring cover 3 attached along the opening 2 and covering the blower motor 30 is capable of forming a wall to block the second route. Moreover, the ring cover 3 has the bump-and-dip portions 6 on the periphery of the blower motor 30. Hence, the bump-and-dip portions 6 having the protrusions 6*h*1 and 6*h*2 force water climbing up the wall to swirl back. The water 10 swirled back as indicated by an arrow Y1 of FIG. 1 runs down the flange portion 3*f* covering the surface of the motor holder 1 or the surface of the motor holder 1 from the lower end of the sleeve portion 3*s*.

The ring cover 3 is capped on the periphery of the blower motor 30 and covers and conceals a clearance between the blower motor 30 and the motor holder 1 from above (from the blower fan side). The ring cover 3 includes the annular skirt portion 3*w*. The annular skirt portion 3*w* is formed continuously from the rim of the flange portion 3*f* which covers the surface of the motor holder 1 from the lower end of the sleeve portion 3*s* and lightly press-fit into the annular groove 1*m* of the motor holder 1.

Hence, a labyrinth structure is formed by the annular groove 1*m* of the motor holder 1 and the annular skirt portion 3*w* lightly press-fit into the annular groove 1*m*.

The labyrinth structure is capable of blocking water that comes inside from the clearance between a lower part of the flange portion 3*f* in FIG. 1 and the motor holder 1 by running through the first route R1 same as the one shown in FIG. 8.

The motor holder 1 is coupled to the blower casing 5*k* (FIG. 6) surrounding the blower fan 5 with bolts or the like in a known manner. The blower fan 5 is formed of a multi-blade fan having a large number of blades 5*b* on the outer periphery. At a center, the blower fan 5 also has a fan center portion 51 expanding like an umbrella from top to bottom of FIG. 1 and to which the rotation shaft 4 is coupled in the same manner as shown in FIG. 8. It should be noted that neither the rotation shaft 4 nor the fan center portion 51 is shown in FIG. 1 because both are located more on the left side.

In the present embodiment, as in the same manner in FIG. 8, the blower fan 5 has a fan basis 510 forming a part of a lower surface of the blower fan 5 and to which the rotation shaft 4 is coupled. The annular skirt portion 3*w* is set at a position at which water coming from the fan basis 510 and running down a slope portion 52 as a part of the fan basis 510 falls on the outer peripheral side of the annular skirt portion 3*w*. In other words, dimensions are set so that a radial length from the center axis 30*j* of the blower motor 30 to an outer rim 521 at a lowermost end of the slop portion 52 is longer than a radial length from the center axis 30*j* of the blower motor 30 to the annular skirt portion 3*w*. The flange portion 3*f* has an inclined portion 31 to guide falling water to the outer peripheral side of the annular skirt portion 3*w*. It should be appreciated, however, that the flange portion 3*f* does not necessarily have to include such an inclined portion.

As are shown in FIG. 1, the protrusions 6*h*1 and 6*h*2 are provided on an inner side of the slope portion 52 on the outer surface of the fan basis 510 so as to protrude toward the slope portion 52 at a predetermined interval. The second protrusion 6*h*2 at the lowest position protrudes from the sleeve portion 3*s* in a longest length.

The bump-and-dip portions 6 include the multiple ring-like protrusions 6*h*1 and 6*h*2 and the multiple dents 6*d*1 and 6*d*2 provided under the protrusions 6*h*1 and 6*h*2, respectively. Water climbing up the sleeve portion 3*s* provided with the protrusions 6*h*1 and 6*h*2 and the dents 6*d*1 and 6*d*2 has to surmount the multiple protrusions 6*h*1 and 6*h*2. Because the height H1 of the dent 6*d*2 at the lowest step is set to be the highest, water that has reached the sleeve portion 3*s* is swirled back by the dent 6*d*2 and the second protrusion 6*h*2 along a large curve as is indicated by the arrow Y1. Consequently, a force of water trying to surmount the first protrusion 6*h*1 at a higher step is attenuated considerably.

Water that has run down the slope portion 52 as a part of the fan basis 510 is inhibited from coming into the blower motor 30 by the labyrinth structure formed of the annular skirt portion 3*w* and the annular groove 1*m* and by the bump-and-dip portions 6.

As is shown in FIG. 1, the blower fan 5 has the fan basis 510 expanding like an umbrella from top to bottom at the center of the blower fan 5. The fan basis 510 has the fan center portion 51 not shown in FIG. 1 and the slope portion 52. The multiple protrusions 6h1 and 6h2 are provided on the inner side of the slope portion 52 of the fan basis 510 at a predetermined interval (3 mm or longer). Hence, even when the second protrusion 6h2 at the bottom step has the longest protruding length, the first protrusion 6h1 does not make contact with the inner side of the slope portion 52 because the slope portion 52 expands like an umbrella. Hence, rotations of the blower fan 5 are not interfered with at all.

Owing to the presence of the slop portion 52 as above, the second protrusion 6h2 at the bottom step can be formed to have the longest protruding length. Hence, water full of force can be swirled back along a large arc as is indicated by the arrow Y1 in FIG. 1 and FIG. 4 by the second protrusion 6h2 having a long protruding length and the dent 6d2.

According to the embodiment above, water fell from the blower fan 5 falls on the surface of the motor holder 1. The water further heads for the blower motor 30 through a clearance between the surface of the motor holder 1 and the ring cover 3. However, the water incoming route is bent in a U shape by the annular skirt portion 3w inserted into the annular groove 1m. The labyrinth structure is formed by inserting the annular skirt portion 3w into the annular groove 1m. Because the labyrinth structure lies in the water incoming route, entrance of water into the blower motor 30 can be prevented. Water that has reached the top of the ring cover 3 has to surmount the sleeve portion 3s provided to erect like a wall. Hence, water reaching as far as the blower motor 30 can be limited by the sleeve portion 3s.

Water climbing up the sleeve portion 3s is swirled back by the protrusion 6h1 or 6h2. Hence, water reaching as far as the blower motor can be limited.

Even when water succeeds in surmounting the second protrusion 6h2 at a lower step, water cannot reach the blower motor 30 unless the water further surmounts the first protrusion 6h1. Hence, water coming inside can be limited further.

The sleeve portion 3s, the first protrusion 6h1, and the second protrusion 6h2 are covered by the umbrella-like slope portion 52. Hence, because the sleeve portion 3s, the first protrusion 6h1 and the second protrusion 6h2 do not directly receive water falling from the blower fan 5, water hardly comes into the blower motor 30.

The first protrusion 6h1 and the second protrusion 6h2 interfere with rotations of the blower fan 5 when making contact with the lower end of the slope portion 52 of the blower fan 5. It is therefore necessary for the first protrusion 6h1 and the second protrusion 6h2 not to make contact with the lower end of the slope portion 52 of the blower fan 5. Because the slope portion 52 expands like an umbrella, it is easy to set the radial protruding length of the second protrusion 6h2 longer than the radial protruding length of the first protrusion 6h1. Consequently, water that has come inside can be swirled back by the second protrusion 6h2 along a larger curve in a more reliable manner.

When the annular skirt portion 3w is inserted into the annular groove 1m by fitting the ring cover 3 to the motor holder 1 from above, a pressure is applied radially by the inner peripheral portion 3s1 of the sleeve portion 3s to the outer peripheral portion 301 of the blower motor 30. Hence, the sleeve portion 3s and the blower motor 30 no longer form a clearance in between and water coming inside through the clearance can be limited.

Other Embodiment

The scope of the present disclosure is not limited to the range exemplified with the structure of the embodiment. The range of the present disclosure is shown by the appended claims, and also includes all the changes in the equivalence. The structures of the above embodiments are merely exemplary, and technical scopes of the present disclosure are not limited to the disclosed scopes. The technical scope of the present disclosure is represented by the claims, and includes meanings equivalent to those of the claims, and all changes in the scope.

Besides the multi-blade fan, the blower fan may also be an axial-flow fan. The blower motor may be a brushless motor. The present disclosure is preferably applied to a case where a high-speed blower motor at 5000 rpm or higher is used because prevention of incoming water is particularly crucial. The present disclosure, however, may also be applied to a motor at 5000 rpm or slower. In addition, the present disclosure is also applicable to a sealed motor in which an armature is covered with a cylindrical motor housing. The present disclosure applied to a sealed motor can limit a formation of rust or the like due to water coming into a blower motor, in particular, a bearing portion, from a portion where the rotation shaft of the sealed motor protrudes from the motor housing.

Further, the embodiment above has described a case where the center axis 30j of the blower motor is vertical. However, it is sufficient to form the blower motor for water to splatter on the blower fan from above, that is, from top. In other words, the present disclosure is also applicable even when the center axis 30j of the blower motor is not vertical and tilts up to about 45 degrees.

What is claimed is:

1. A blower device comprising:
    a motor holder having an opening at a center and an annular groove along the opening;
    a blower motor attached to the motor holder, the blower motor having a motor top and a rotation shaft protruding from the opening;
    a ring cover attached to the motor holder to cover a periphery of the blower motor along the opening; and
    a blower fan having a rotation center to which the rotation shaft is coupled above the blower motor, wherein
    the ring cover includes
        a sleeve portion covering the periphery of the blower motor in a ring shape,
        a flange portion extending continuously from a lower end of the sleeve portion in an annular shape to partially cover a surface of the motor holder,
        a skirt portion protruding from the flange portion in an annular shape and inserted into the annular groove,
        the sleeve portion has a protrusion protruding on a periphery in an annular shape, and
        a dent is defined between the protrusion and the flange portion.

2. The blower device according to claim 1, wherein:
    the protrusion is one of a plurality of protrusions provided at a predetermined interval in a direction from top to bottom.

3. The blower device according to claim 2, wherein:
    of the plurality of protrusions, a protruding length from the sleeve portion is set longer with one protrusion at a lowest position than with another protrusion located above.

4. The blower device according to claim 1, wherein:
    the blower fan has
        a fan basis forming a part of a lower surface of the blower fan and coupled to the rotation shaft, and
        an umbrella-like slope portion inclined so as to become lower from the fan basis to an outer periphery; and the sleeve portion and the skirt portion are located on an inner side of an outer rim of the slope portion.

5. The blower device according to claim 1, wherein:
the sleeve portion surrounds the motor top in a cylindrical shape;
a sectional shape of the sleeve portion is a wedge shape that becomes thinner from top to bottom;
an inner peripheral portion of the sleeve portion tilts with respect to the rotation shaft; and
an outer peripheral portion of the motor top in close contact with the inner peripheral portion also tilts with respect to the rotation shaft.

6. A blower device comprising:
a motor holder having an opening at a center and an annular groove along the opening;
a blower motor attached to the motor holder, the blower motor having a motor top and a rotation shaft protruding from the opening;
a ring cover attached to the motor holder to cover a periphery of the blower motor along the opening; and
a blower fan having a rotation center to which the rotation shaft is coupled above the blower motor, wherein
the ring cover includes
a sleeve portion covering the periphery of the blower motor in a ring shape,
a flange portion extending continuously from a lower end of the sleeve portion in an annular shape to partially cover a surface of the motor holder, and
a skirt portion protruding from the flange portion in an annular shape and inserted into the annular groove,
the blower fan has
a fan basis forming a part of a lower surface of the blower fan and coupled to the rotation shaft, and
an umbrella-like slope portion inclined so as to become lower from the fan basis to an outer periphery; and
the sleeve portion and the skirt portion are located on an inner side of an outer rim of the slope portion.

7. The blower device according to claim 6, wherein:
the sleeve portion has a protrusion protruding on a periphery in an annular shape.

8. The blower device according to claim 7, wherein:
the protrusion is one of a plurality of protrusions provided at a predetermined interval in a direction from top to bottom.

9. The blower device according to claim 8, wherein:
of the plurality of protrusions, a protruding length from the sleeve portion is set longer with one protrusion at a lowest position than with another protrusion located above.

10. A blower device comprising:
a motor holder having an opening at a center and an annular groove along the opening;
a blower motor attached to the motor holder, the blower motor having a motor top and a rotation shaft protruding from the opening;
a ring cover attached to the motor holder to cover a periphery of the blower motor along the opening; and
a blower fan having a rotation center to which the rotation shaft is coupled above the blower motor, wherein
the ring cover includes
a sleeve portion covering the periphery of the blower motor in a ring shape,
a flange portion extending continuously from a lower end of the sleeve portion in an annular shape to partially cover a surface of the motor holder, and
a skirt portion protruding from the flange portion in an annular shape and inserted into the annular groove,
the sleeve portion surrounds the motor top in a cylindrical shape,
a sectional shape of the sleeve portion is a wedge shape that becomes thinner from top to bottom,
an inner peripheral portion of the sleeve portion tilts with respect to the rotation shaft, and
an outer peripheral portion of the motor top in close contact with the inner peripheral portion also tilts with respect to the rotation shaft.

11. The blower device according to claim 10, wherein:
the sleeve portion has a protrusion protruding on a periphery in an annular shape.

12. The blower device according to claim 11, wherein:
the protrusion is one of a plurality of protrusions provided at a predetermined interval in a direction from top to bottom.

13. The blower device according to claim 12, wherein:
of the plurality of protrusions, a protruding length from the sleeve portion is set longer with one protrusion at a lowest position than with another protrusion located above.

* * * * *